United States Patent
Guillon et al.

(10) Patent No.: US 12,252,234 B2
(45) Date of Patent: Mar. 18, 2025

(54) AIRCRAFT CONTROL COLUMN WITH IMPROVED OVERALL REDUCTION RATIO AND METHOD FOR USING SUCH A CONTROL COLUMN

(71) Applicant: SAFRAN ELECTRONICS & DEFENSE, Boulogne-Billancourt (FR)

(72) Inventors: Clément Guillon, Moissy-Cramayel (FR); Rémi-Louis Lawniczak, Moissy-Cramayel (FR); Yvon Joncour, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 428 days.

(21) Appl. No.: 17/757,630

(22) PCT Filed: Nov. 30, 2020

(86) PCT No.: PCT/EP2020/083970
§ 371 (c)(1),
(2) Date: Jun. 17, 2022

(87) PCT Pub. No.: WO2021/121941
PCT Pub. Date: Jun. 24, 2021

(65) Prior Publication Data
US 2023/0020880 A1    Jan. 19, 2023

(30) Foreign Application Priority Data
Dec. 20, 2019   (FR) ..................................... 1915220

(51) Int. Cl.
*B64C 13/38*     (2006.01)
*G05G 9/047*    (2006.01)

(52) U.S. Cl.
CPC ............ *B64C 13/38* (2013.01); *G05G 9/047* (2013.01); *G05G 2009/04718* (2013.01); *G05G 2009/04766* (2013.01)

(58) Field of Classification Search
CPC .................... B64C 13/38; G05G 9/047; G05G 2009/04718; G05G 2009/04766
(Continued)

(56) References Cited

U.S. PATENT DOCUMENTS 5,059,882 A    10/1991  Marcillat et al.
5,589,854 A *  12/1996  Tsai ...................... G06F 3/0383
                                                          345/161
(Continued)

FOREIGN PATENT DOCUMENTS

EP    2081822 A2    7/2009
FR    3011815 A1    4/2015

OTHER PUBLICATIONS

Search Report from the French Intellectual Property Office on corresponding FR application (FR1915220) dated Aug. 17, 2020.
(Continued)

*Primary Examiner* — Ha Dinh Ho
(74) *Attorney, Agent, or Firm* — Alumen IP Law PC

(57) ABSTRACT

The invention relates to an aircraft control column, the control column comprising a first shaft and a control lever configured to rotate the first shaft about a first axis through a first angular range [α1; α3] via a mechanical joint having a primary reduction ratio, the control column comprising a braking device configured to brake the first shaft via a first transmission device having a secondary reduction ratio, the secondary reduction ratio being maximum for an angular position, the secondary reduction ratio increasing over the range [α1; α4] and then decreasing over the range [α4; α3]

(Continued)

so as to obtain an overall reduction ratio that has a limited amplitude of variation over the first angular range [α1; α3].

14 Claims, 10 Drawing Sheets

(58) Field of Classification Search
USPC .......................................................... 74/335
See application file for complete search history.

(56) References Cited

U.S. PATENT DOCUMENTS

| | | | | |
|---|---|---|---|---|
| 5,629,594 | A * | 5/1997 | Jacobus | ............. G05G 9/04737 318/590 |
| 5,929,846 | A | 7/1999 | Rosenberg et al. | |
| 7,176,892 | B2 * | 2/2007 | Kobayashi | ............. G05G 9/047 700/83 |
| 8,542,105 | B2 * | 9/2013 | Grant | .................... A63F 13/245 273/317.1 |
| 10,613,629 | B2 * | 4/2020 | Laurendeau | ........ G06F 3/04845 |
| 2007/0298877 | A1 * | 12/2007 | Rosenberg | .............. A63F 13/23 345/184 |
| 2019/0286237 | A1 | 9/2019 | Eck et al. | |

OTHER PUBLICATIONS

International Search Report and Written Opinion on corresponding PCT application (PCT/EP2020/083970) from International Searching Authority (EPO) dated Feb. 2, 2021.
Search Report from the French Intellectual Property Office on corresponding FR application (FR1915211) dated Aug. 13, 2020.
International Search Report and Written Opinion on corresponding PCT application (PCT/EP2020/083962) from International Searching Authority (EPO) dated Feb. 3, 2021.

* cited by examiner ion of the position of the control lever 101 along these two axes
AIRCRAFT CONTROL COLUMN WITH IMPROVED OVERALL REDUCTION RATIO AND METHOD FOR USING SUCH A CONTROL COLUMN

TECHNICAL FIELD

The present invention relates to a control column used by the pilot in an aircraft cockpit. It especially relates to a force application device for a control column in order to assist the pilot.

In a known manner, with reference to FIG. 1, a control column 100 comprises a control lever 101 rotatably mounted along a roll axis X and a pitch axis Y, these two axes X, Y being orthogonal to each other. The control column 100 transmits displacement commands COM to aircraft control members X9 (flaps, etc.), which are determined as a function of the position of the control lever 101 along these two axes X, Y.

In a known manner, still with reference to FIG. 1, the control column 100 comprises a force application device XD comprising two active force feedback members 131, 132, also called haptic feedback, so that the pilot perceives a force feedback at the control lever 101 on each of the roll axis X and pitch axis Y. Such force feedback members 131, 132 are known to the skilled person from patent application FR 3011815A1. An active force feedback member 131, 132, in particular an electric motor, allows the force feedback to be parameterized according to a dynamic control law. An active force feedback member 131, 132 is therefore opposed to a passive force feedback, in particular a spring device, whose control law is a static stiffness.

In practice, the control column 100 comprises a first shaft XA1 with axis XA, mechanically connected to the rotational movements of the control lever 101 about the roll axis X, and a second shaft XB1 with axis XB, mechanically connected to the rotational movements of the control lever 101 about the pitch axis Y. The control column 100 further comprises a mechanical joint 102 connecting the shafts XA1, XB1 to the rotational movements of the control lever 101. Such a mechanical joint 102 is known to the person skilled in the art, in particular, from patent application FR3011815.

During the operation of the control column 100, the active force feedback members 131, 132 respectively generate a resistive force on the shafts XA1, XB1 opposing the force exerted on the control lever 101. Piloting sensations are restored in an optimal way, which increases flight safety. Preferably, position sensors 141, 142 are mounted to the shafts XA1, XB1 so as to indirectly determine position of the control lever 101 along the roll X and pitch Y axes.

In the event of an electrical or mechanical failure in one of the force feedback members 131, 132, or in the event of a partial or total failure in the processing chain of the control signals of these force feedback members 131, 132, or in the event of a failure in the electrical power supply, the control column 100 operates in an emergency mode and the force feedback is suppressed.

According to the emergency mode, in order to prevent free piloting of the control lever 101, it is known to provide two braking members 151, 152 to lock position of the control lever 101. In practice, two electrically activatable magnetorheological braking members have been provided that act respectively on the roll axis X and pitch axis Y of the control lever 101 by braking the shafts XA1, XB1 as illustrated in FIG. 1.

In the emergency mode, the control lever 101 is braked by the two braking members 151, 152 to its current position so as to immobilize it. In order to pilot, the pilot uses the control lever 101 as a "force sensor" to act on the piloting members of the aircraft X9. If the pilot exerts a very strong force on the control lever 101, it can nevertheless move until it comes into contact with a mechanical stop. Such a functionality allows to avoid breaking the control lever 101 or other mechanical members of the kinematic chain.

In practice, the control lever 101 is configured to rotatably drive the first shaft XA1 about the first axis XA through a first angular range [$\alpha 1$; $\alpha 3$] via the mechanical joint 102. In this example, the first angular range is defined between [$-20°$; $+20°$]. With reference to FIG. 2A, the mechanical joint 102 has a primary reduction ratio RA1 that is minimum for a given angular position $\alpha 2$, which in this example is equal to $0°$. The primary reduction ratio RA1 is decreasing over the range [$\alpha 1$; $\alpha 2$] and then increasing, preferably strictly, over the range [$\alpha 2$; $\alpha 3$]. In this example, the primary reduction ratio RA1 has a sinusoidal shape with an increasing first derivative. Thus, the primary reduction ratio RA1 is variable as a function of the angular position in which the control lever 101 is immobilized.

In an analogous manner, the control lever 101 is configured to rotatably drive the second shaft XB1 about the second axis XB in a second angular range [$\beta 1$; $\beta 3$] via the mechanical joint 102. In this example, the second angular range is defined between [$-15°$; $+15°$]. With reference to FIG. 2B, the mechanical joint 102 has a primary reduction ratio RB1 that is minimum for a given angular position $\beta 2$, which in this example is equal to $0°$. The primary reduction ratio RB1 is decreasing over the range [$\beta 1$; $\beta 3$] and then increasing, preferably strictly, over the range [$\beta 2$; $\beta 3$]. Similarly, the primary reduction ratio RB1 has a sinusoidal shape with an increasing first derivative. Thus, the primary reduction ratio RB1 is variable as a function of the angular position in which the control lever 101 is immobilized.

Such a variation in the primary reduction ratio RA1, RB1 is specific to the mechanical joint 102 and cannot be modified. It has several drawbacks which will be now set forth.

In practice, for the roll axis X, the control lever 101 can be moved if the pilot force Ep is greater than a threshold force Es which is equal to the braking force Ef multiplied by the primary reduction ratio RA1 (Ep>Es=Ef*RA1). Since the braking force Ef is constant and the primary reduction ratio RA1 is variable over the angular range [$\alpha 1$; $\alpha 3$], the threshold force Es is variable over the angular range [$\alpha 1$; $\alpha 3$].

As an example, with reference to FIG. 2A, if the control lever 101 is blocked at position P1 on the roll axis X, the primary reduction ratio RA1 is small and the control lever 101, in the braked state, can be moved by a calibrated force provided by the pilot. Conversely, if the control lever 101 is blocked at position P2 on the roll axis X, the primary reduction ratio RA1 is large and the control lever 101, in the braked state, can be moved with at least twice the force required for position P1. This difference in the operation of the control lever 101 is a drawback for a pilot who prefers a linear behavior for any angular position of immobilization.

In practice, the braking member 151 is sized for the minimum value of the reduction ratio and this results in excessive braking for other values of the reduction ratio, in particular, for position P2. Thus, if the pilot wishes to move the control lever 101 to position P2, he/she has to apply a very large mechanical force and is likely to break the control lever 101, which is a drawback.

Further, such a sizing of the braking member 151 negatively impacts the overall size and mass of the control column, which is another drawback.

A first immediate solution would be to produce a braking member 151 applying a force that varies as a function of the angular position of immobilization. The control of such a braking member 151 is complex and cannot be retained.

Another immediate solution to eliminate this drawback would be to reinforce mechanical members of the kinematic chain of the control lever 101, but this would increase the overall size, mass and cost of a control column 100.

The invention thus aims at eliminating at least some of these drawbacks by proposing a new control column of limited overall size and reduced mass while allowing braking of the control lever so that the latter can be moved over the entire range of movement of the control lever with a calibrated force that does not jeopardize the kinematic chain of the control lever.

SUMMARY

The invention relates to an aircraft control column, the control column comprising a first shaft and a control lever configured to rotatably drive the first shaft about a first axis over a first angular range [$\alpha_1$; $\alpha_3$] by means of a mechanical joint having a primary reduction ratio, the primary reduction ratio being minimum for a given angular position, the primary reduction ratio decreasing over the range [$\alpha_1$; $\alpha_2$] and then increasing over the range [$\alpha_2$; $\alpha_3$], the control column comprising a force application device comprising at least one braking device configured to brake the first shaft through a first transmission device having a secondary reduction ratio, the secondary reduction ratio being maximum for a given angular position, the secondary reduction ratio being increasing over the range [$\alpha_1$; $\alpha_4$] and then decreasing over the range [$\alpha_4$; $\alpha_3$] so as to achieve an overall reduction ratio between the control lever and the braking device having a limited amplitude of variation over the first angular range [$\alpha_1$; $\alpha_3$].

Advantageously, the first transmission device allows a secondary reduction ratio to be defined, that allows to compensate for variations in the primary reduction ratio resulting from the mechanical joint. Thus, during an emergency mode, when the braking device is activated, the control lever of the control column can be moved with the same force by the pilot, which improves piloting sensations even in emergency mode. Further, the risk of breaking a kinematic chain component of the control lever is significantly reduced.

Preferably, the secondary reduction ratio is substantially symmetrical to the primary reduction ratio so as to achieve a substantially constant overall reduction ratio over the first angular range [$\alpha_1$; $\alpha_3$]. Thus, the overall reduction ratio is substantially flat, which is advantageous. Preferably, the overall reduction ratio ranges from 2 to 3 over the first angular range [$\alpha_1$; $\alpha_3$]. Such an overall reduction ratio remains high and allows the use of a braking device providing a limited braking force.

According to one aspect, the first transmission device comprises at least one connecting rod, preferably two connecting rods. Advantageously, the use of connecting rods provides a non-linear secondary reduction ratio, which is advantageous for compensating for a primary reduction ratio that is, itself, non-linear.

According to one preferred aspect, each connecting rod is straight, i.e., one-piece and free of hinges.

According to another aspect, the first transmission device comprises at least one connecting rod mounted in a 90-90 position between the first braking member and the first shaft. A 90-90 position advantageously allows for a secondary reduction ratio adapted for a limited overall size.

The axes of the first braking member and the first shaft are parallel to each other. The hinge angular positions of the connecting rod are defined with respect to a reference axis which passes through the centers of the axes of the first braking member and the first shaft.

According to another aspect, the first transmission device comprises at least one connecting rod mounted in a 0-0 position between the first braking member and the first shaft. Advantageously, a 0-0 position provides a secondary reduction ratio with a high flatness.

According to one aspect, the first transmission device comprises at least one connecting rod that is hinged. Advantageously, the use of a hinged connecting rod allows for an increased secondary reduction ratio when the connecting rod is in a hinged position.

Preferably, the first transmission device comprises at least two hinged connecting rods that are cross-mounted. The use of two connecting rods allows the secondary reduction ratio to be increased over a central angular portion, which is advantageous for achieving an overall high value reduction ratio over a central angular portion. The primary reduction ratio induced by the mechanical joint is optimally compensated for.

According to one aspect, the control column comprising a second shaft, the control lever configured to rotatably drive the second shaft about a second axis through a second angular range [$\beta_1$; $\beta_3$] via the mechanical joint having a primary reduction ratio, the primary reduction ratio being minimum for a given angular position, the primary reduction ratio decreasing over the range [$\beta_1$; $\beta_2$] and then increasing over the range [$\beta_2$; $\beta_3$], the braking device is configured to brake the second shaft via a second transmission device having a secondary reduction ratio, the secondary reduction ratio being maximum for a given angular position, the secondary reduction ratio being increasing over the range [$\beta_1$; $\beta_4$] and then decreasing over the range [$\beta_4$; $\beta_3$] so as to achieve an overall reduction ratio, between the control lever and the braking device, having a limited amplitude of variation over the second angular range [$\beta_1$; $\beta_3$].

Advantageously, each shaft may benefit from the advantages of the invention to allow the pilot to achieve an overall reduction ratio, between the control lever and the braking device, having a limited amplitude of variation for each displacement of the control lever.

Preferably, the braking device comprises two braking members configured to cooperate respectively with the first transmission device and the second transmission device.

Preferably, the braking device comprises a casing and two braking members coaxially mounted in the casing so as to simultaneously brake the transmission devices. Such a common braking device allows for limited overall size and mass compared to using two independent braking devices to brake both shafts.

According to one aspect, the braking devices projectingly extend from said casing in a same direction. This advantageously allows the transmission devices to be placed between the braking device and the control lever. The overall size is limited.

According to another aspect, the braking members projectingly extend from said casing in opposite directions. This advantageously allows the transmission devices to be distributed so that more space is available to achieve the desired secondary reduction ratios.

The invention also relates to a method for using a control column, as set forth previously, wherein, according to a nominal mode of operation, the braking device being inactive so as to allow free rotation of the first shaft, the method comprises a step of activating the braking device according to an emergency mode of operation in which the braking device brakes the first shaft via the first transmission device so as to achieve an overall reduction ratio between the control lever and the braking device having a limited amplitude of variation over the first angular range [α1; α3].

By virtue of the invention, in an emergency mode, the pilot can move the control lever with a substantially constant overall reduction ratio over the first angular range [α1; α3] which improves piloting sensations and reduces the risk of breaking an element of the control lever kinematic chain.

BRIEF DESCRIPTION OF THE DRAWINGS

The invention will be better understood upon reading the following description, which is given solely by way of example, and refers to the appended drawings given as non-limiting examples, in which identical references are given to similar objects and in which.

It should be noted that the figures set out the invention in detail to implement the invention, said figures of course being capable of being used to better define the invention where appropriate.

DETAILED DESCRIPTION

Figure 3:
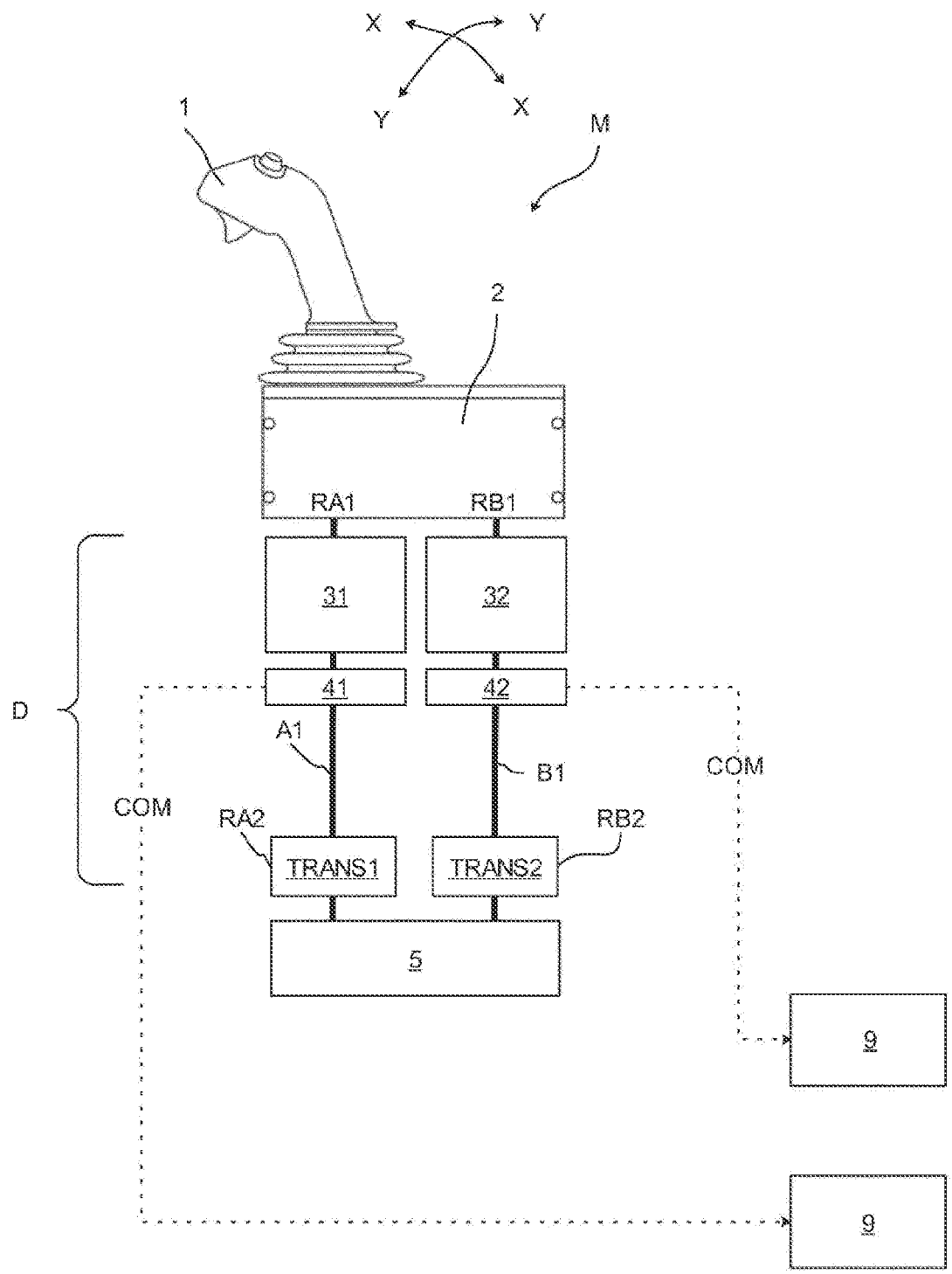
FIG. 3 is a schematic representation of a control column according to the invention comprising transmission devices between the braking device and the shafts.

With reference to FIG. 3, there is represented a control column M for an aircraft which comprises a control lever 1 rotatably mounted along a roll axis X and a pitch axis Y, these two axes X, Y being orthogonal to each other. The control column M transmits displacement commands COM to aircraft control elements 9 (flaps, etc.), which are determined as a function of the position of the control lever 1 along these two axes X, Y. The invention more particularly relates to a mini-stick located in a cockpit of the aircraft.

In practice, the control column M comprises a first shaft A1 of axis A, mechanically connected to the rotational movements of the control lever 1 about the roll axis X, and a second shaft B1 of axis B, mechanically connected to the rotational movements of the control lever 1 about the pitch axis Y. The control column M further comprises a mechanical joint 2 connecting the shafts A1, B1 to the rotational movements of the control lever 1. Such a mechanical joint 2 is known to those skilled in the art, in particular, from patent application FR3011815.

The control column M comprises a force application device D comprising two active force feedback members 31, 32, also called haptic feedback, so that the pilot perceives a force feedback at the control lever 1 on each of the roll X and pitch Y axes. Such force feedback members 31, 32 are known to the person skilled in the art from patent application FR 3011815A1. An active force feedback device 31, 32, in particular an electric motor, allows the force feedback to be parameterized according to a dynamic control law. An active force feedback member 31, 32 is thus opposed to a passive force feedback, in particular a spring device, whose control law is static.

According to the invention, with reference to FIG. 3, the force application device D comprises a single braking device 5 configured to brake the first shaft A1 and the second shaft B1. Nevertheless, it goes without saying that the shafts A1, B1 could be braked by distinct braking devices 5.

During the operation of the control column M, the active force feedback elements 31, 32 respectively generate a resistive force on the shafts A1, B1 opposing the force exerted on the control lever 1. Piloting sensations are restored in an optimal way, which increases flight safety. In this example, position sensors 41, 42 are mounted to the shafts A1, B1 so as to indirectly determine position of the control lever 1 along the roll X and pitch Y axes.

In the event of an electrical or mechanical failure in one of the force feedback members 31, 32, or in the event of a partial or total failure in the chain for processing the control signals of these force feedback members 31, 32, or in the event of a failure in the electrical power supply, the control column M operates according to an emergency mode and the force feedback is eliminated.

According to the emergency mode, to prevent free piloting of the control lever 101, it is known that the braking device 5 brakes the position of the control lever 1 by acting on the roll axis X and pitch axis Y of the control lever 1 respectively by braking the shafts A1, B1 as illustrated in FIG. 3. An example of a braking device 5 will be set forth in detail later.

During the emergency mode, the control lever 1 is braked by the braking device 5 to its current position so as to immobilize it. In order to pilot, the pilot uses the control lever 1 as a "force sensor" to act on the steering components of the aircraft 9. If the pilot exerts a very large force on the control lever 1, this can nevertheless move until it comes into contact with a mechanical stop. Such a functionality avoids breaking the control lever 1 or other mechanical members of the kinematic chain.

Figure 1:
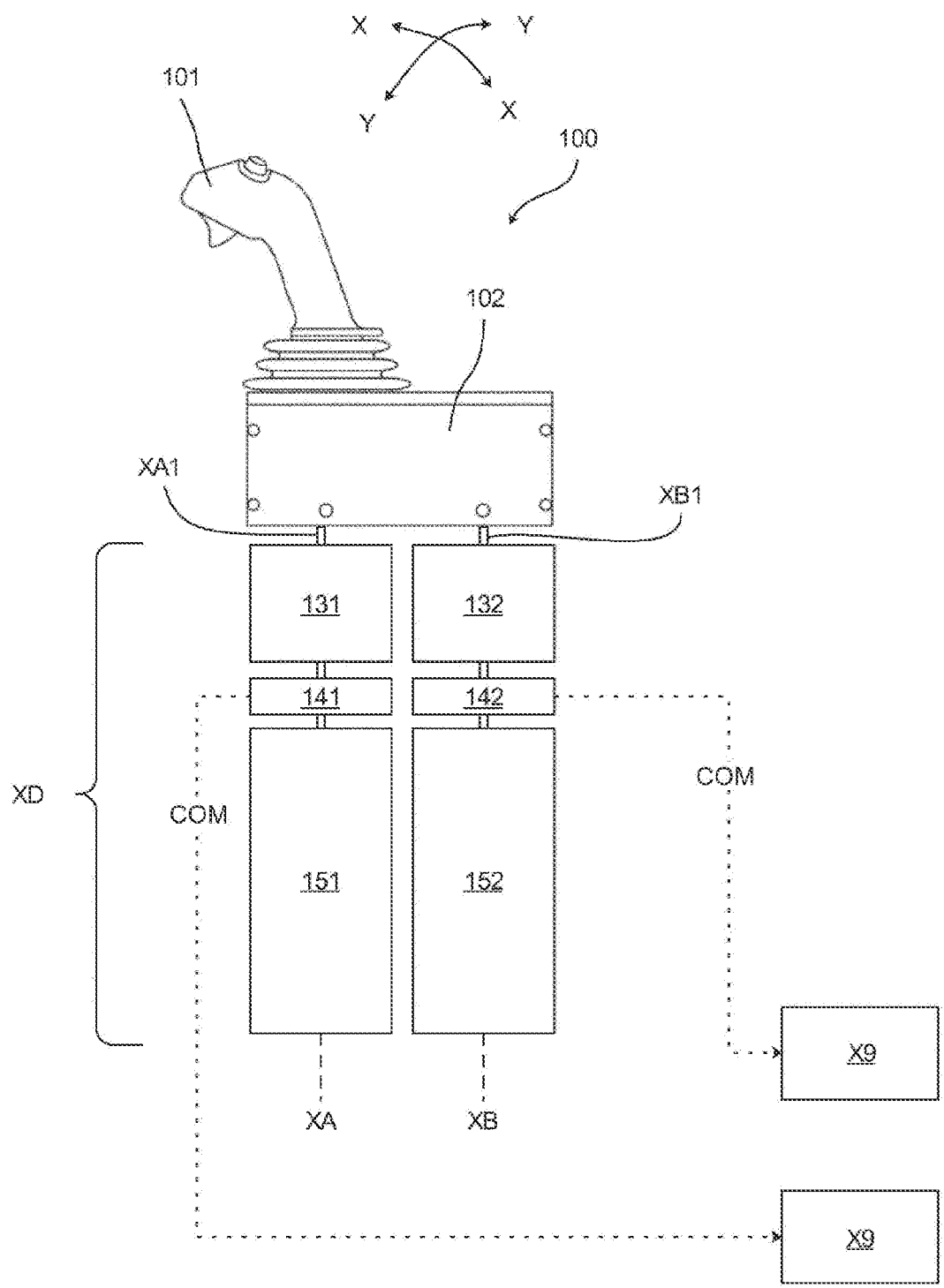
FIG. 1 is a schematic representation of a control column according to prior art.
Figure 2A:
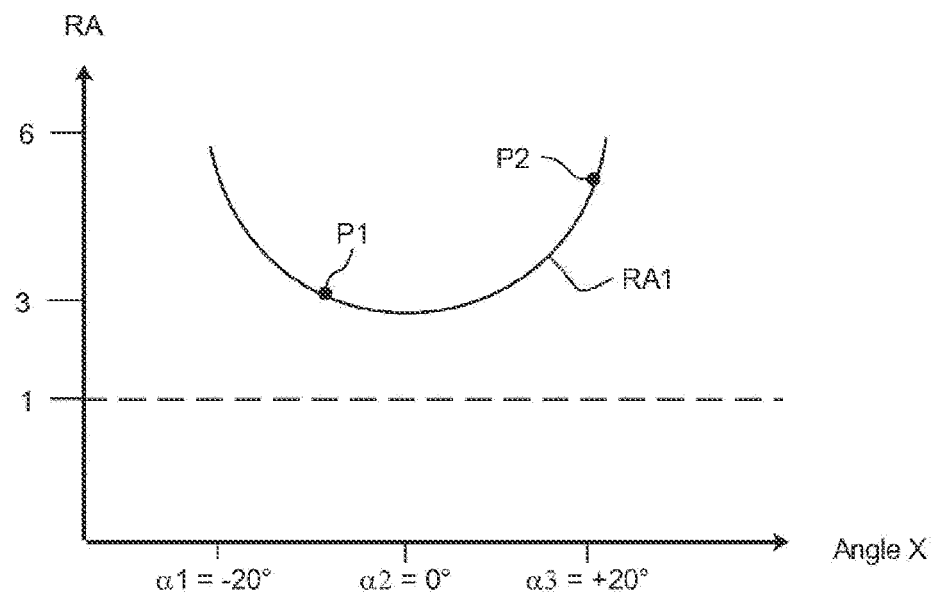
FIG. 2A is a schematic representation of the primary reduction ratio that connects the control lever to a first shaft of the control column.
Figure 2B:
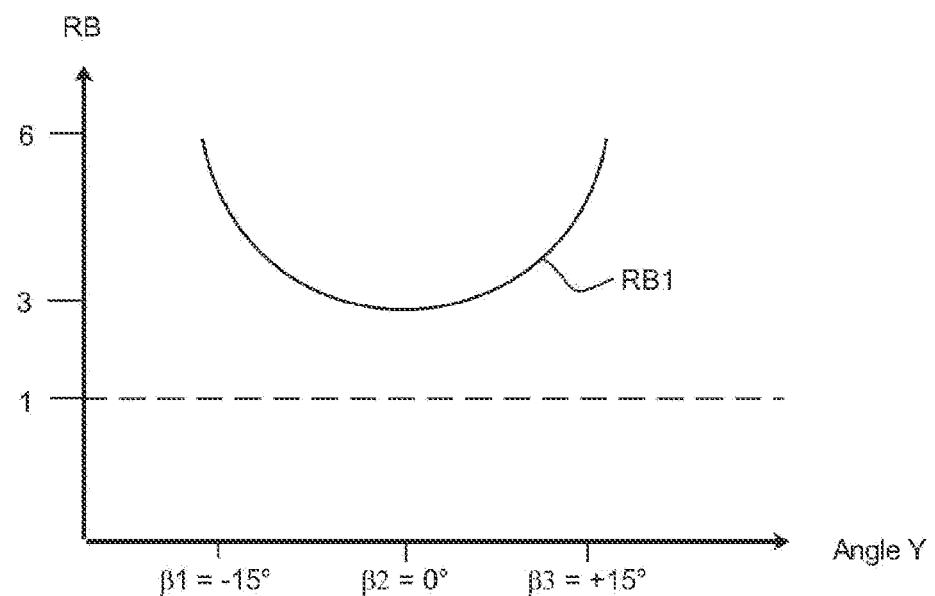
FIG. 2B is a schematic representation of the primary reduction ratio that connects the control lever to a second control column shaft.

As indicated in the preamble, with reference to FIGS. 2A and 2B, the control lever 1 is configured to rotatably drive the first shaft A1 about a first axis A in a first angular range $[\alpha 1; \alpha 3]$ and the second shaft B1 about the second axis B in a second angular range $[\beta 1; \beta 3]$.

The control lever 1 is configured to rotatably drive the first shaft A1 about the first axis A in a first angular range $[\alpha 1; \alpha 3]$ through the mechanical joint 2. In this example, the first angular range is defined between $[-20°; +20]$. With reference to FIG. 2A, the mechanical joint 2 has a primary reduction ratio RA1 that is minimum for a given angular position $\alpha 2$, which in this example is equal to $0°$. The primary reduction ratio RA1 is decreasing over the range $[\alpha 1; \alpha 2]$ and then increasing, preferably strictly, over the range $[\alpha 2; \alpha 3]$. In this example, the primary reduction ratio RA1 has a sinusoidal shape with an increasing first derivative. Thus, the reduction ratio RA1 is variable as a function of the angular position in which the control lever 1 is immobilized.

In an analogous manner, the control lever 1 is configured to rotatably drive the second shaft B1 about the second axis B in a second angular range $[\beta 1; \beta 3]$ by means of the mechanical joint 2. In this example, the second angular range is preferably defined between $[-15°; +15]$. With reference to FIG. 2B, the mechanical joint 2 has a primary reduction ratio RB1 that is minimum for a given angular position $\beta 2$, which in this example is equal to $0°$. The primary reduction ratio RB1 is decreasing over the range $[\beta 1; \beta 2]$ and then increasing, preferably strictly, over the range $[\beta 2; \beta 3]$. Similarly, the primary reduction ratio RB1 has a sinusoidal shape with an increasing first derivative. Thus, the primary reduction ratio RA1, RB1 is variable as a function of the angular position in which the control lever 1 is immobilized. Of course, the angular values $\alpha 1$, $\alpha 2$, $\alpha 3$, $\beta 1$, $\beta 2$, $\beta 3$ could be different depending on the context of use.

According to the invention, with reference to FIG. 3, the braking device 5 is configured to brake the first shaft A1 via a first transmission device TRANS1 having a secondary reduction ratio RA2 over the first angular range $[\alpha 1; \alpha 3]$.

Similarly, the braking device 5 is configured to brake the second shaft B1 via a second transmission device TRANS2 having a secondary reduction ratio RB2 over the first angular range $[\beta 1; \beta 3]$.

Obviously, the control column M could comprise only one transmission device TRANS1/TRANS2. For the sake of clarity and brevity, only the first transmission device TRANS1 will be set forth to achieve the secondary reduction ratio RA2, the second transmission device TRANS2 being analogous.

Figure 4A:
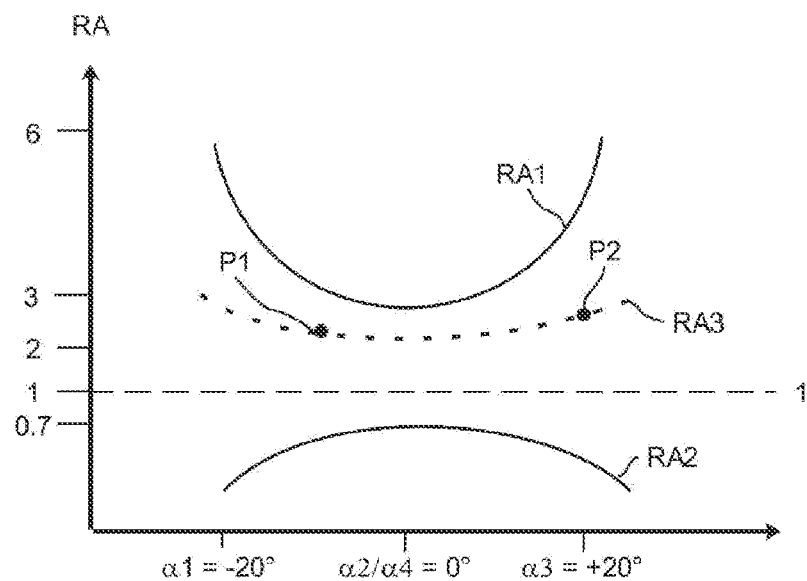
FIG. 4A is a schematic representation of the primary reduction ratio, the secondary reduction ratio and the overall reduction ratio for the first shaft with a connecting rod in 90-90 position.

As illustrated in FIG. 4A, the secondary reduction ratio RA2 is maximum for a given angular position $\alpha 4$, the secondary reduction ratio RA2 being increasing over the range $[\alpha 1; \alpha 4]$ and then decreasing over the range $[\alpha 4; \alpha 3]$ so as to achieve an overall reduction ratio RA3 between the control lever 1 and the braking device 5 having a limited amplitude of variation over the first angular range $[\alpha 1; \alpha 3]$. In this example, as illustrated in FIG. 4A, the angular positions $\alpha 2$, a4 are the same and equal to $0°$ but it goes without saying that they could be different.

Advantageously, the first transmission device TRANS1 makes it possible to define a secondary reduction ratio RA2, between the first shaft A1 and the braking device 5, which compensates for the primary reduction ratio RA1 between the first shaft A1 and the control lever 1 in order to achieve an overall reduction ratio RA3 which is substantially constant so as to allow a pilot to move the control lever 1 homogeneously over the first angular range $[\alpha 1; \alpha 3]$ and independently of the angular position of immobilization of the control lever 1.

Figure 4B:
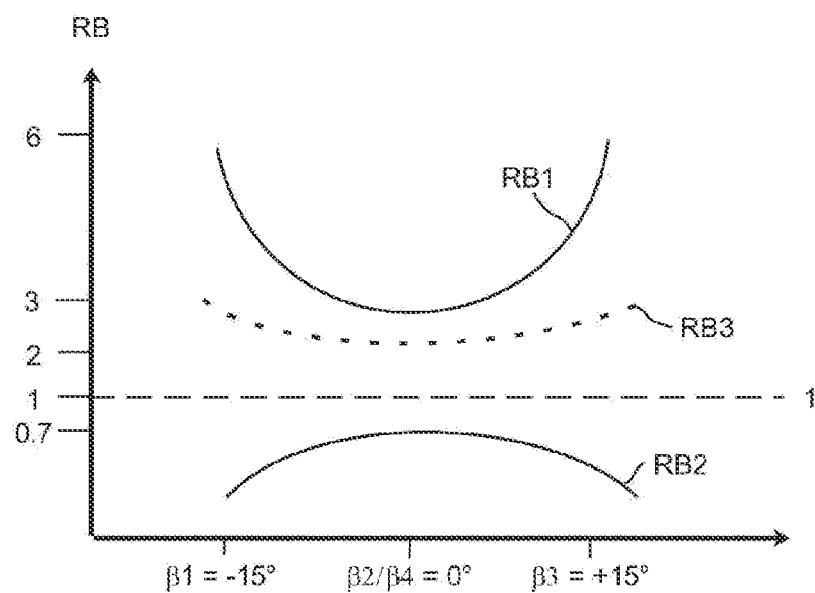
FIG. 4B is a schematic representation of the primary reduction ratio, the secondary reduction ratio and the overall reduction ratio for the second shaft with a connecting rod in 90-90 position.

Preferably, the secondary reduction ratio RA2 is substantially symmetrical to the primary reduction ratio RA1 so as to achieve a substantially constant overall reduction ratio RA3 over the first angular range $[\alpha 1; \alpha 3]$ as illustrated in FIG. 4A. In this example, with reference to FIG. 4A, the overall reduction ratio RA3 ranges from 2 to 3 over the first angular range $[\alpha 1; \alpha 3]$. The same is true for the second shaft B1 as illustrated in FIG. 4B.

Figure 5:
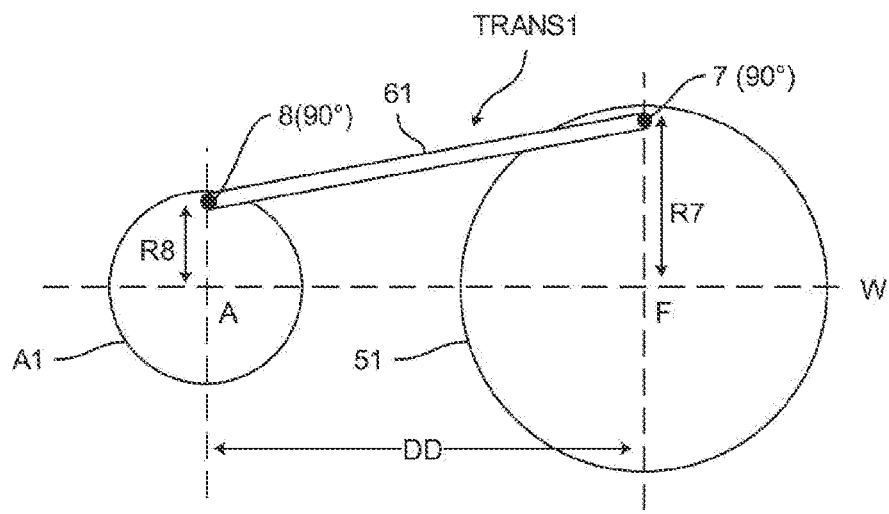
FIG. 5 is a schematic perspective representation of a connecting rod in the 90-90 position between the first brake member and the first shaft.

With reference to FIG. 5, the first transmission device TRANS1 is in the form of a connecting rod connecting the first braking member 51 to the first shaft A so as to define a secondary reduction ratio RA2, as previously set forth.

The first shaft A1 is rotatably movable about a first axis A while the first braking member 51 is rotatably movable about a first braking axis F. The axes A, F are parallel and spaced apart along an axis W by a distance DD as illustrated in FIG. 5. The axis W, which passes through the centers of the axes A, F, forms a reference axis corresponding to the angular position $0°$.

The first braking member 51 comprises a hinge 7 distant from the first braking axis F by a distance R7. Similarly, the first shaft A1 comprises a hinge 8 distant from the first axis A by a distance R8. The hinges 7, 8 are connected by a straight connecting rod 61, i.e. a single piece, having a length L61. Advantageously, the connecting rod 61 achieves a secondary reduction ratio RA2 which is non-linear.

Subsequently, a geometric ratio is defined, which corresponds to the ratio of the radii between that of the first shaft A1, i.e., the radius R8, and that of the first braking member 51, i.e., the radius R7. The geometric ratio R7/R8 is preferably between 0.5 and 0.75. Indeed, a geometric ratio R7/R8 lower than 0.5 increases amplitude of the variations of the overall reduction ratio RA3 over the first angular range $[\alpha 1; \alpha 3]$ (imperfect flatness) while a geometric ratio R7/R8 higher than 0.75 induces an overall reduction ratio RA3 of high value.

Still referring to FIG. 5, in the initial position, the joints 7, 8 are each positioned at $90°$ with respect to the reference direction W. Thereafter, the connecting rod 61 is referred to as being in the 90-90 position. Following tests, a 90-90 position is advantageous since it allows a geometric ratio R7/R8 between 0.5 and 0.75 with a small overall size.

As illustrated in FIG. 4A, the values of the overall reduction ratio RA3 are lower than those of the primary reduction ratio RAL. For example, at the angular position $\alpha 2$ ($=\alpha 4=0°$), the primary reduction ratio RA1 is equal to 2.87 while it is equal to 2.15 for the overall reduction ratio RA3 for a radius R7 of 13 mm. The gain in flatness has been obtained by a decrease in the performance of the reduction ratio, which requires a more efficient braking device 5 to compensate for the low reduction ratio. In the following, a new architecture of a more efficient braking device 5 will be set forth to limit the overall size and mass.

Advantageously, the shape of the secondary reduction ratio RA2 can be adapted in order to optimally compensate for the primary reduction ratio RA1.

Figure 6:
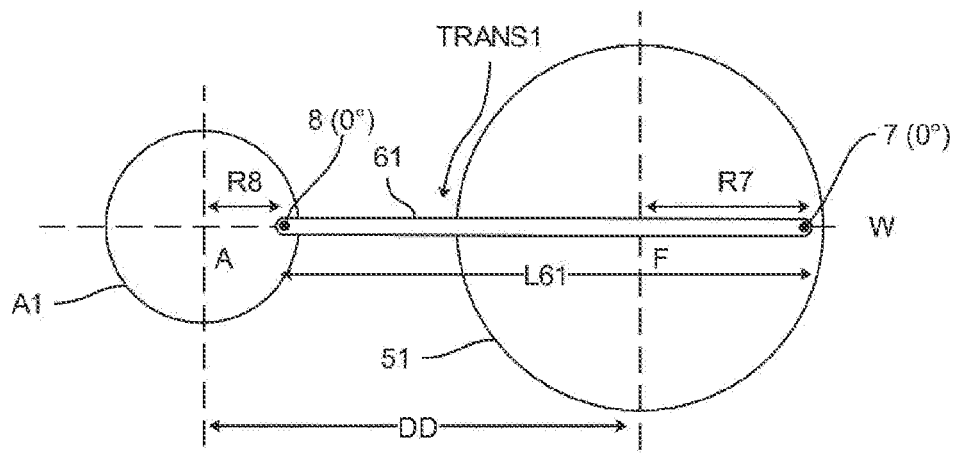
FIG. 6 is a schematic perspective representation of a connecting rod in 0-0 position between the first braking member and the first shaft.

With reference to FIG. 6, another embodiment in which the position of the connecting rod 61 is changed is represented. In the initial position, the hinges 7, 8 are each positioned at 0° with respect to the reference direction W. Hereinafter, the connecting rod 61 is referred to as being in the 0-0 position. In this 0-0 position, the following equation is obtained: R8+L61=DD+R7.

Figure 7:
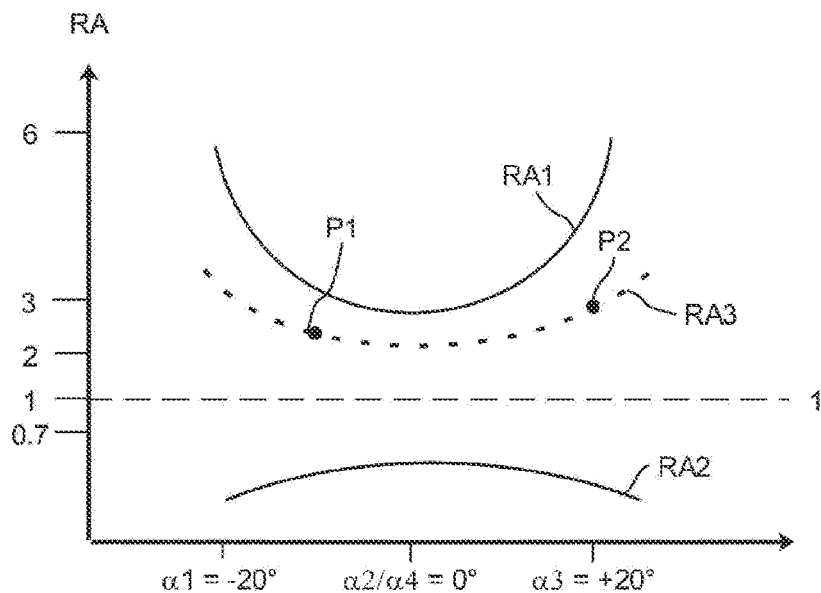
FIG. 7 is a schematic representation of the primary reduction ratio, the secondary reduction ratio and the overall reduction ratio for the first shaft with a connecting rod in 0-0 position.

As illustrated in FIG. 7, such a 0-0 position is advantageous since it allows the secondary reduction ratio RA2 to be modified by increasing the flatness while maintaining a minimum value of overall reduction ratio RA3 which is high.

For a connecting rod in the 0-0 position, one of the hinges 7, 8 may be mounted in an oblong hole to avoid any instability or blockade.

Figure 8A:
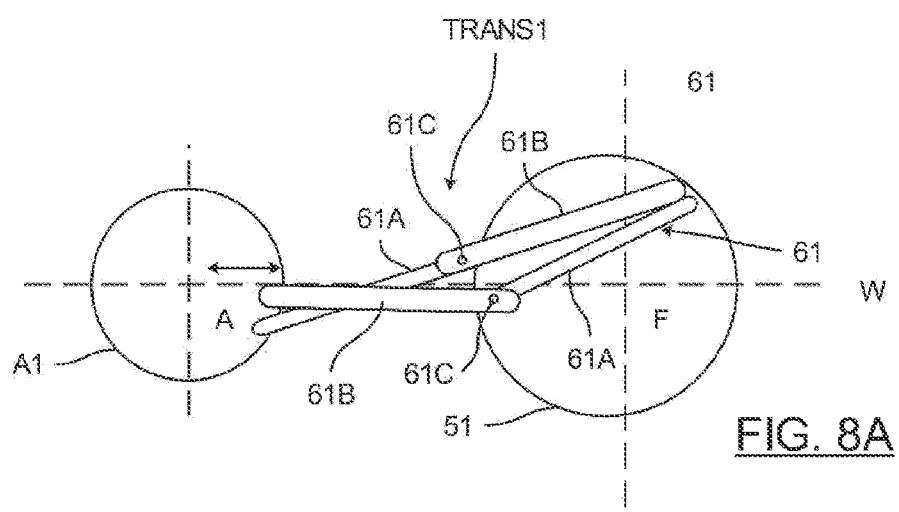
FIG. 8A
Figure 8B:
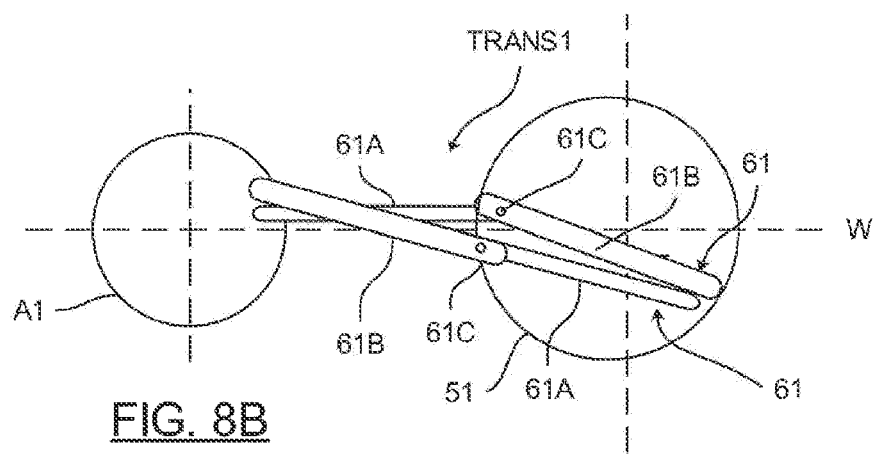
FIG. 8B are schematic representations of a first transmission device comprising two cross-hinged connecting rods.
Figure 9:
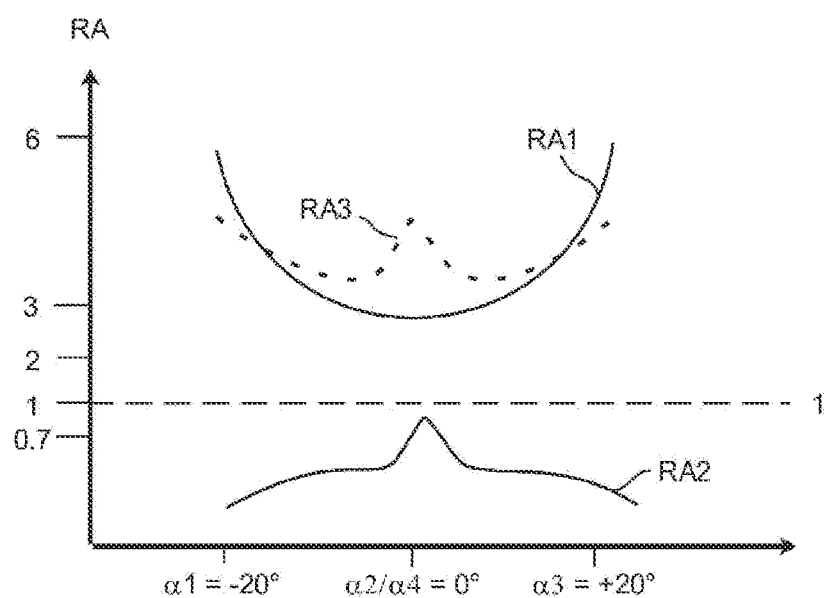
FIG. 9 is a schematic representation of the primary reduction ratio, secondary reduction ratio and overall reduction ratio for the first shaft with two cross-hinged connecting rods.

As illustrated in FIGS. 8A and 8B, the first transmission device TRANS1 comprises two connecting rods 61 connecting the first braking member 51 to the first shaft A. In this example, each connecting rod 61 is hinged and comprises two parts 61A, 61B connected by a hinge axis 61C. The combined use of two hinged connecting rods 61 advantageously makes it possible to modify shape of the secondary reduction ratio RA2, in particular, by increasing the maximum reduction ratio at the angular point α4, i.e., in a central angular range. With reference to FIG. 9, the shape of the secondary reduction ratio RA2 comprises three inflection points so as to achieve a maximum reduction ratio at the angular point α4 and, consequently, an overall reduction ratio RA3 that is not minimum at the angular point α4(=α2).

In this example, the connecting rods 61 are substantially at the 0-0 position. The connecting rods 61 are cross-mounted as illustrated in FIGS. 8A-8B. Such one embodiment is advantageous given that it reduces amplitude of the overall reduction ratio RA3. Further, the value of the overall reduction ratio RA3 is higher than in other embodiments, which allows for limiting braking forces.

In FIGS. 5, 6 and 8A-8B, pivot-type hinges 7, 8 have been represented, but it goes without saying that ball-and-socket hinges could be suitable.

According to one preferred aspect of the invention, the braking device 5 is common to the two shafts A1, B1 and comprises a casing 50, a first braking member 51 and a second braking member 52 which are coaxial and are rotatably mounted in the casing 50 and are configured to cooperate respectively with the first shaft A1 and the second shaft B1 so as to brake them. Advantageously, a common braking device 5 makes it possible to reduce overall size and mass in comparison with two separate devices. The use of two coaxial braking elements 51, 52 makes it possible to reduce overall size in a casing 50 while maintaining optimal braking. Indeed, the braking forces are advantageously shared between both braking members 51, 52.

Figure 10:
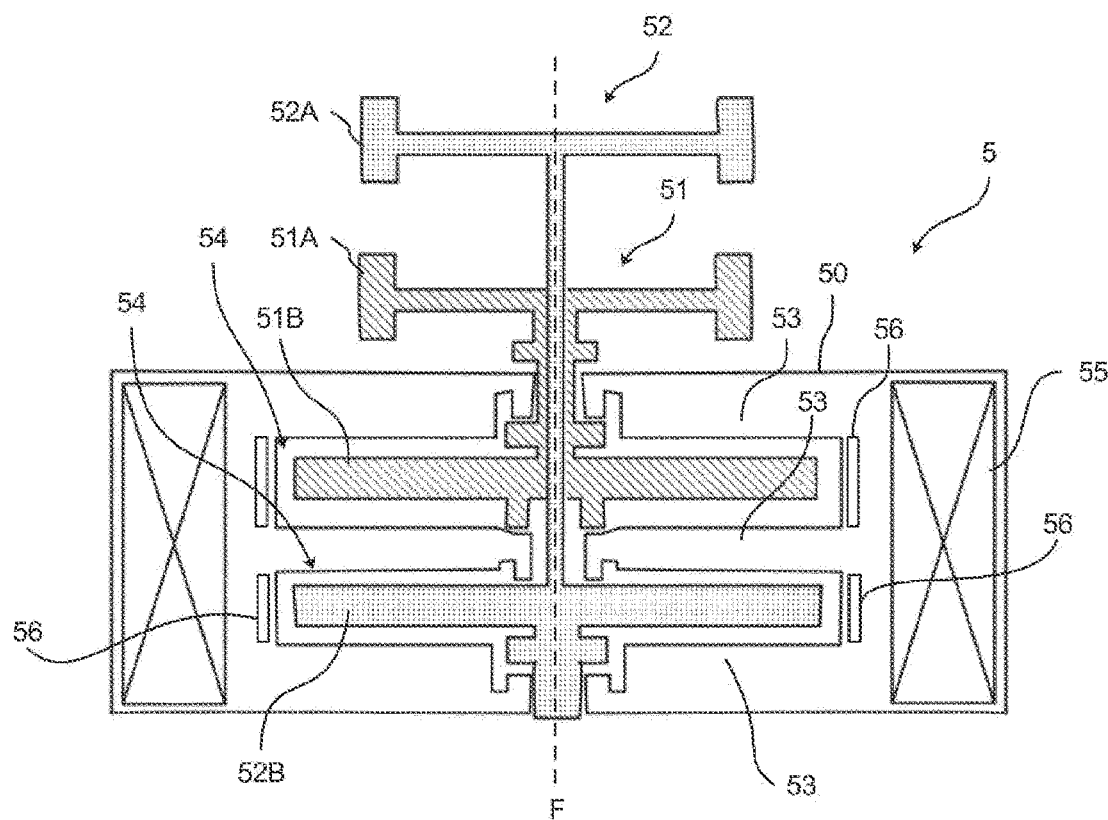
FIG. 10 is a schematic representation of one embodiment of a common braking device.
Figure 11:
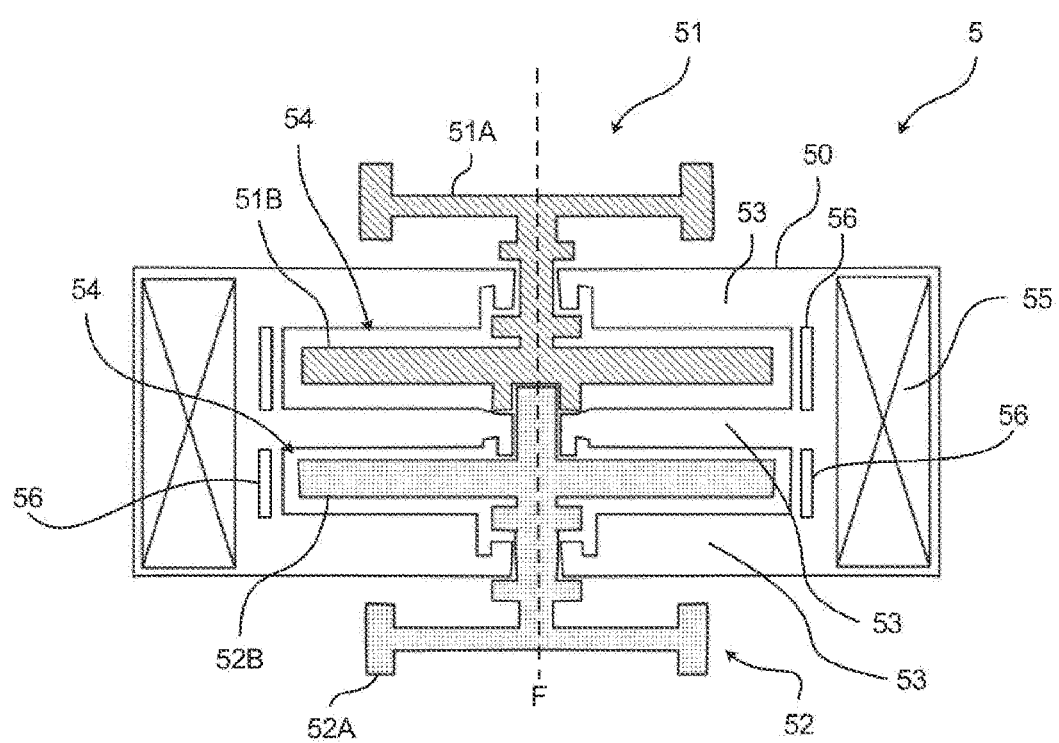
FIG. 11 is a schematic representation of one embodiment of another common braking device.

With reference to FIGS. 10 and 11, two embodiments of a common braking device 5 are represented. In these embodiments, the casing 50 forms a housing for the braking members 51, 52. In this exemplary embodiment, the braking members 51, 52 are coaxial along a braking axis F. The common braking device 5 comprises a plurality of brake disks 53 which are spaced apart along the braking axis F so as to define between them sealed volumes 54 for receiving the brake members 51, 52 as will be subsequently set forth. The sealed volumes 54 are filled with a magnetorheological fluid. The common braking device 5 further comprises a magnetic source 55, in particular a coil, for activating the magnetorheological fluid in the sealed volumes 54 in the emergency mode. The sealed volumes 54 are axially offset from the braking axis F.

Each braking member 51, 52 comprises a drive portion 51A, 52A and at least one brake portion 51B, 52B that is housed in a sealed volume 54. With reference to FIGS. 10 and 11, each braking member 51, 52 comprises a single brake portion 51B, 52B but of course there could be more of them to adapt the braking force.

During operation of the control column M in a nominal mode, the magnetorheological fluid of the sealed volumes 54 is in a liquid state and the brake members 51, 52 can be freely rotatably driven by the control lever 101 via the shafts A1, B1. The brake portions 51B, 52B of the brake members 51, 52 shear the magnetorheological fluid contained in the sealed volumes 54 without stress.

In the emergency mode, under the effect of a magnetic field applied by the magnetic source 55, the magnetorheological fluid is magnetized. Within the magnetorheological fluid, particles suspended in a carrier fluid (typically metal particles) align as chains of particles parallel to the field lines of the magnetic field applied. The resistance of the magnetorheological fluid to shearing is increased by the magnetic field applied. The magnetorheological fluid thus tends to prevent rotation of the brake portions 51B, 52B of the brake members 51, 52. The resistive torque exerted by the magnetized magnetorheological fluid is much greater than the resistive torque exerted by the non-magnetized magnetorheological fluid.

According to one aspect of the invention, with reference to FIGS. 10 and 11, the braking device 5 further comprises one or more electromagnetic coils, as a magnetic source 55, configured to exert a variable magnetic field at the sealed volumes 54 of magnetorheological fluid, so as to vary the shearing resistance of the magnetorheological fluid as well as the amagnetic elements 56 in order to direct the field lines. The coil is, for example, disposed on one side of the braking device 5, near the sealed volumes 54 containing the magnetorheological fluid. The coil 55 is typically used to simulate a damping law, during normal operation of the control column M.

One advantage of such a common braking device 5 is its small overall size. The common braking device 5 couples and decouples on command the rotational movements of the braking members 51, 52 by means of a small number of mechanical components. Such a common braking device 5 further has good resistive torque transmission performance.

The overall size is further reduced according to the invention since it integrates two coaxial braking members so as to brake them together in a simultaneous manner. The magnetic source 55 and the magnetorheological fluid are advantageously shared.

The drive portions 51A, 51B of the braking members 51, 52 projectingly extend from the casing 50 so as to be able to cooperate integrally with the shafts A1, B1, directly or indirectly.

With reference to FIG. 10, the drive portions 51A, 51B of the brake members 51, 52 extend in the same direction with respect to the casing 50. This makes it possible to reduce the overall size. To this end, the first braking member 51 is hollow so that the second braking member 52 extends internally to the first braking member 51. With reference to FIG. 11, the drive portions 51A, 51B of the brake members 51, 52 extend in opposite directions with respect to the casing 50. This makes it possible to integrate connection members with the shafts A1, B1 for adjusting the reduction ratio as will be set forth later. For this purpose, the braking members 51, 52 are not fitted into each other but are juxtaposed. Advantageously, depending on the architecture selected for the force application device D, a common braking device 5 according to the configuration of FIG. 10 or FIG. 11 can be advantageously chosen.

Preferably, the common braking device 5 comprises one or more rolling bearings to facilitate rotation of the braking members 51, 52 in the casing 50.

Advantageously, from a control point of view, only a single braking device 5 needs to be controlled, which provides a further synergistic advantage.

A common braking device 5 comprising two brake shafts 51, 52 has been represented, but of course it could comprise more than two of them. This is advantageous when the control lever 1 comprises more than two degrees of freedom.

A common braking device 5 of the magnetic type has been represented, but it goes without saying that it could be of another, for example mechanical, type.

Several transmission device architectures TRANS1, TRANS2 connecting a common braking device 5 to the shafts A1, B1 will now be set forth. Such architectures make it possible to satisfy, on the one hand, organizational and overall size restrictions and, on the other hand, to achieve the desired secondary reduction ratio RA2. Indeed, it is important that the secondary reduction ratio RA2 (shaft/braking member) can compensate for the primary reduction ratio RA1 (shaft/control lever). In these examples, the shafts A1, B1 are vertical and parallel to each other.

Figure 12A:
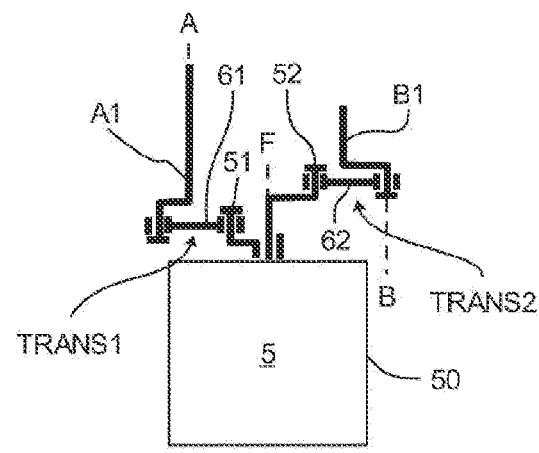
FIG. 12A

With reference to FIG. 12A, the common braking device 5 comprises a braking axis F that is vertical and two braking members 51, 52 that projectingly extend vertically upwardly. The first brake member 51 is indirectly connected to the first shaft A1 through a first connecting rod 61. Similarly, the second braking member 52 is connected indirectly to the second shaft B1 through a second connecting rod 62. Such an architecture has a reduced overall size and allows the two shafts A1, B1 to be braked in a similar manner. The use of connecting rods 61, 62 makes it possible to increase the secondary reduction ratio RA2, RB2 in a non-linear manner. Advantageously, the limited angular clearance of each of the shafts A1, B1 allows the use of connecting rods 61, 62 since the braking members 51, 52 run through a reduced sector of the circumference. The axes of rotation of the ends of the connecting rods 61, 62 may be parallel or equipped with ball joints.

Figure 12B:
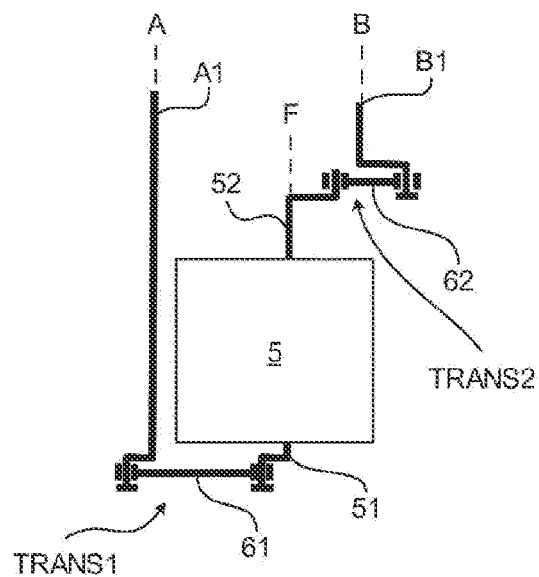
FIG. 12B

With reference to FIG. 12B, the common braking device 5 comprises a braking axis F that is vertical and two braking members 51, 52 that projectingly extend vertically downwardly and upwardly, respectively. The first braking member 51 is connected indirectly to the first shaft A1 through a first connecting rod 61. Similarly, the second braking member 52 is connected indirectly to the second shaft B1 through a second connecting rod 62. Such an architecture has a reduced overall size and allows the two shafts A1, B1 to be braked in a similar manner. The vertical space is thus optimally utilized. This is advantageous for achieving the desired secondary reduction ratio RA2.

Figure 12C:
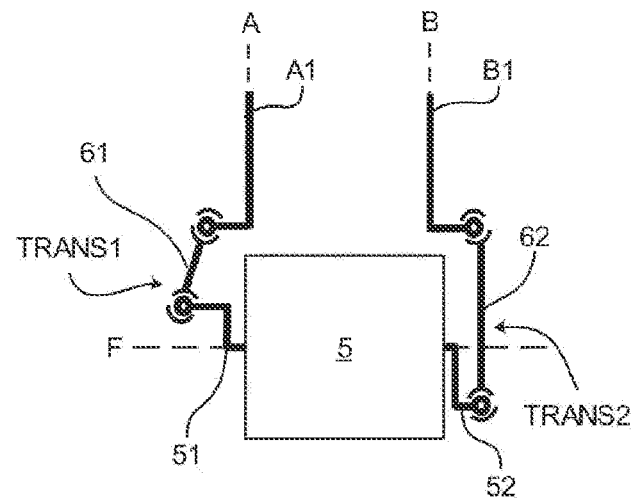
FIG. 12C
Figure 12D:
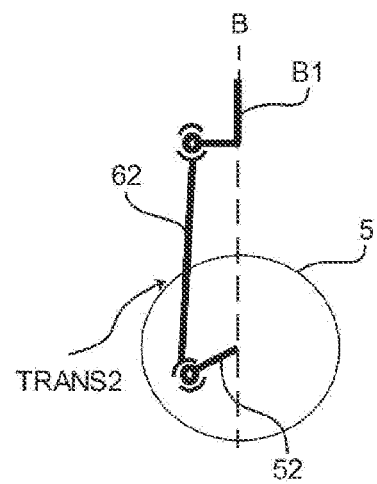
FIG. 12D are schematic representations of several architectures for connecting a common braking device to shafts via connecting rods.

With reference to FIGS. 12C and 12D, the common braking device 5 comprises a braking axis F that is horizontal and two braking members 51, 52 that projectingly extend horizontally to the left and to the right, respectively. The first braking member 51 is connected indirectly to the first shaft A1 through a first connecting rod 61, while the second braking member 52 is connected indirectly to the second shaft B1 through a second connecting rod 62. Such an architecture has a reduced overall size and allows the two shafts A1, B1 to be braked in a similar manner. The horizontal space is thus optimally used. In this example, the axes of rotation of the ends of the connecting rods 61, 62 are equipped with ball joints.

In addition, a common braking device 5 has been set forth with a braking axis F parallel or orthogonal to the axes A, B of the shafts A1, B1, but it goes without saying that the tilt of the braking axis F could be any tilt. The same applies to the axes A, B of the shafts A1, B1.

Thus, advantageously, the present invention makes it possible to adapt to various design restrictions of a control column M.

An example of the use of a control column M will now be set forth with reference to FIG. 3.

When using the control column M in a nominal mode, the pilot freely manipulates the control lever 1 along the roll axis X and pitch axis Y, which rotatably drives the shafts A1, B1 via the mechanical joint 2. The position of the shafts A1, B1 is measured by the position sensors 41, 42 in order to transmit displacement commands COM to the control elements of the aircraft 9 (flaps, etc.).

The force feedback members 31, 32 are active so that the pilot perceives a force feedback at the control lever 1 on each of the roll X and pitch Y axes. The braking device 5 is inactive and the braking members 51, 52 are free to rotate in the casing 50.

When the control column M is used in an emergency mode following a malfunction, the force feedback members 31, 32 are inactive and the pilot does not perceive any force feedback at the control lever 1. The braking device 5 is active and the braking members 51, 52 are no longer free to rotate in the casing 50. The braking device 5 imposes a secondary reduction ratio RA2 on the shafts A1, B1 and compensates, at least in part, for the primary reduction ratio RA1 of the shafts A1, B1 with the control lever 1. The control lever 1 is then braked to the position in which it was when switching to emergency mode. The pilot thus immediately perceives that he/she is in an emergency mode. If the pilot exerts a great deal of force on the control lever 1, this can move until it reaches a mechanical stop. By virtue of the overall reduction ratio RA3 that has been achieved, the displacement of the control lever 1 is advantageously linear. Moreover, as the overall reduction ratio RA3 is substantially flat, the force required by the pilot to allow a displacement is substantially identical for any angular position of the control lever 1 when braked (see positions P1 and P2 in FIG. 7).

In the emergency mode, the angular position sensors 41, 42 are no longer used to generate piloting setpoints. Separate force sensors, present in the control lever 1 which has become fixed, allow to take over as a backup to transmit the COM displacement commands to the control members of the aircraft 9 (control surfaces, etc.).

By virtue of the invention, the force application device D has a limited overall size and a reduced mass. The common braking device 5 advantageously makes it possible to act synergistically on the two shafts A1, B1 in order to brake them together in the emergency mode.

The invention claimed is:

1. A control column of an aircraft, the control column comprising a first shaft and a control lever configured to rotatably drive the first shaft about a first axis in a first angular range [α1; α3] by means of a mechanical joint having a primary reduction ratio, the primary reduction ratio being minimum for a given angular position α2, the primary reduction ratio for the first axis being decreasing over a range [α1; α2] and then increasing over a range [α2; α3]; the control column comprising a force application device comprising at least one braking device configured to brake the first shaft via a first transmission device having a secondary reduction ratio, the secondary reduction ratio being maximum for a given angular position α4, the secondary reduction ratio for the first axis being increasing over a range [α1; α4] and then decreasing over a range of range [α4; α3] so as to achieve an overall reduction ratio for the first axis between the control lever and the braking device having a first axis limited amplitude of variation over the first angular range [α1; α3].

2. The control column of an aircraft according to claim 1, wherein the secondary reduction ratio is substantially symmetrical to the primary reduction ratio so as to achieve a substantially constant overall reduction ratio over the first angular range [α1; α3].

3. The control column of an aircraft according to claim 2, wherein the overall reduction ratio ranges from 2 to 3 over the first angular range [α1; α3].

4. The control column of an aircraft according to claim 1, wherein the first transmission device comprises at least one connecting rod.

5. The control column of an aircraft according to claim 4, wherein the first transmission device comprises at least one connecting rod mounted in a 90-90 position between a first braking member and the first shaft.

6. The control column of an aircraft according to claim 4, wherein the first transmission device comprises at least one connecting rod mounted in a 0-0 position between a first braking member and the first shaft.

7. The control column of an aircraft according to claim 4, wherein the first transmission device comprises at least one connecting rod that is hinged.

8. The control column of an aircraft according to claim 7, wherein the first transmission device comprises at least two hinged connecting rods that are cross-mounted.

9. The control column of an aircraft according to claim 1, wherein the control column comprises a second shaft, the control lever being configured to rotatably drive the second shaft about a second axis in a second angular range [β1; β3] via the mechanical joint having a primary reduction ratio, the primary reduction ratio for the second axis being minimum for a given angular position β2, the primary reduction ratio being decreasing over a range [β1; β2] and then increasing over a range [β2; β3], the braking device being configured to brake the second shaft via a second transmission device having a secondary reduction ratio, the secondary reduction ratio being maximum for a given angular position β4, the secondary reduction ratio for the second axis being increasing over a range [β1; β4] and then decreasing over a range [β4; β3] so as to achieve an overall reduction ratio for the second axis between the control lever and the braking device having a second axis limited amplitude of variation over the second angular range [β1; β3].

10. The control column of an aircraft according to claim 9, wherein the braking device comprises two braking members configured to cooperate with the first transmission device and the second transmission device respectively.

11. The control column of an aircraft according to claim 10, wherein the braking device comprises a casing and two braking members coaxially mounted in the casing so as to simultaneously brake the transmission devices.

12. The control column of an aircraft according to claim 10, wherein, the braking members projectingly extend from said casing in a same direction.

13. The control column of an aircraft according to claim 10, wherein the braking members projectingly extend from said casing in opposite directions.

14. A method for using the control column according to claim 1, in which, according to a nominal mode of operation, the braking device being inactive so as to allow free rotation of the first shaft, the method comprises a step of activating the braking device according to an emergency mode of operation in which the braking device brakes the first shaft via the first transmission device in such a way as to achieve an overall reduction ratio, between the control lever and the braking device, having a limited amplitude of variation over the first angular range [α1; α3].

* * * * *